United States Patent [19]

Vanmaele et al.

[11] Patent Number: 5,082,823

[45] Date of Patent: Jan. 21, 1992

[54] CYAN DYES FOR USE IN THERMAL DYE SUBLIMATION TRANSFER

[75] Inventors: Luc J. Vanmaele, Lochristi; Wilhelmus Janssens, Aarschot, both of Belgium

[73] Assignee: Agfa-Gevaert, N.V., Mortsel, Belgium

[21] Appl. No.: 509,220

[22] Filed: Apr. 16, 1990

[30] Foreign Application Priority Data

Apr. 19, 1989 [EP] European Pat. Off. ........ 89201001.8

[51] Int. Cl.⁵ ...................... B41M 5/035; B41M 5/26
[52] U.S. Cl. .......................................... 503/227; 8/471;
428/195; 428/480; 428/913; 428/914

[58] Field of Search .................... 8/471; 428/195, 480, 428/913, 914; 503/227

[56] References Cited

U.S. PATENT DOCUMENTS

| 4,695,287 | 9/1987 | Evans et al. | 503/227 |
| 4,933,315 | 6/1990 | Kanto et al. | 503/227 |
| 4,975,409 | 12/1990 | Mikoshiba et al. | 503/227 |

Primary Examiner—Bruce H. Hess
Attorney, Agent, or Firm—Breiner & Breiner

[57] ABSTRACT

Cyan 2-carbazoyl-4-[N-(p-substituted aminoaryl)imino]-1,4-quinone or 2-hydroxaminocarbonyl-4-[N-(p-substituted aminoaryl)imino]-1,4-quinone dyes for use according to thermal dye sublimation transfer.

6 Claims, No Drawings

CYAN DYES FOR USE IN THERMAL DYE SUBLIMATION TRANSFER

The present invention relates to cyan dye-donor elements for use according to thermal dye sublimation transfer.

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, which may be coated on one or both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye layer, which contains the printing dyes.

The dye layer can be a monochrome dye layer or it may comprise sequential repeating areas of different dyes like e.g. cyan, magenta and yellow dyes. When a dye-donor element containing three or more primary color dyes is used, a multicolor image can be obtained by sequentially performing the dye transfer process steps for each color.

Any dye can be used in such a dye layer provided it is easily transferable to the dye-image-receiving layer of the receiver sheet by the action of heat.

Typical and specific examples of dyes for use in thermal dye sublimation transfer have been described in, e.g., EP 209990, EP 209991, EP 216483, EP 218397, EP 227095, EP 227096, EP 229374, EP 235939, EP 247737, EP 257577, EP 257580, EP 258856, EP 279330, EP 279467, EP 285665, U.S. Pat. Nos. 4,743,582, 4,753,922, 4,753,923, 4,757,046, 4,769,360, 4,771,035, JP 84/78894, JP 84/78895, JP 84/78896, JP 84/227490, JP 84/227948, JP 85/27594, JP 85/30391, JP 85/229787, JP 85/229789, JP 85/229790, JP 85/229791, JP 85/229792, JP 85/229793, JP 85/229795, JP 86/41596, JP 86/268493, JP 86/268494, JP 86/268495 and JP 86/284489. Use of indophenol dyes in thermal dye sublimation transfer have been described in JP 85/239289.

It is an object of the present invention to provide novel cyan dyes for use in thermal dye sublimation transfer printing.

Other objects will become apparent from the description hereinafter.

In accordance with the present invention a cyan dye-donor element for use according to thermal dye sublimation transfer is provided, said dye-donor element comprising a support having thereon a dye layer containing a cyan dye characterized in that said cyan dye comprises a 2-carbazoyl-4-[N-(p-substituted aminoaryl)imino]-1,4-quinone or a 2-hydroxaminocarbonyl-4-[N-(p-substituted aminoaryl)imino]-1,4-quinone.

The quinone may be a benzoquinone or a naphthoquinone, preferably a naphthoquinone.

In a preferred embodiment of the invention, the novel cyan dye corresponds to the following formula (I)

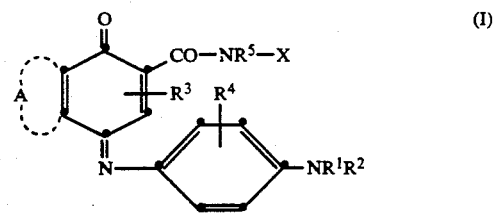

wherein $R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with $R^4$ represent the atoms necessary for completing a fused-on heterocyclic nucleus or substituted fused-on heterocyclic nucleus;

$R^3$ is a substituent chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO$_2$—R', —NH—PO—R'R", —CO—NH—R', —SO$_2$—NH—R' wherein R' and R" (same or different) represent substituted or unsubstituted alkyl, substituted or unsubstituted cycloalkyl or substituted or unsubstituted aryl;

$R^4$ is a substituent having one of the significances given to $R^3$, $R^3$ and $R^4$ being same or different, or $R^4$ together with $R^1$ and/or $R^2$ represents the atoms necessary for completing a fused-on heterocyclic nucleus or substituted fused-on heterocyclic nucleus;

$R^5$ represents hydrogen, substituted or unsubstituted alkyl, substituted or unsubstituted cycloalkyl or substituted or unsubstituted aryl;

A represents the necessary atoms for constituting an aromatic ring fused-on the benzene nucleus, said ring may also have an $R^3$ substituent, and further A may be a substituent similar to the above $R^3$;

X represents $NR^6R^7$ or $OR^8$;

$R^6$ and $R^7$ each independently represent hydrogen, substituted or unsubstituted alkyl, substituted or unsubstituted cycloalkyl, substituted or unsubstituted aryl, SO$_2$R$^9$, COR$^9$ or POR$^9$R$^{10}$, or $R^6$ and $R^7$ together represent the atoms necessary for completing a heterocyclic nucleus or substituted heterocyclic nucleus;

$R^8$ represents hydrogen, substituted or unsubstituted alkyl, substituted or unsubstituted cycloalkyl, substituted or unsubstituted aryl, SO$_2$R$^9$, COR$^9$ or POR$^9$R$^{10}$;

$R^9$ and $R^{10}$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted amino or a substituted or unsubstituted heterocyclic group or $R^9$ and $R^{10}$ together form a 5- or 6-membered ring.

Preferably A represents the atoms necessary for constituting a ring fused-on the benzene ring so that the whole forms a naphthalene ring.

Suitable examples of substituents represented by $R^1$, $R^2$ and $R^5$ are i.a. hydrogen, methyl, ethyl, propyl, isopropyl, butyl, pentyl, hexyl, 2-methoxyethyl, benzyl, 2-(methylsulfonylamino)ethyl, 2-hydroxyethyl, 2-cyanoethyl, methoxycarbonylmethyl, 4-sulfobutyl, cyclohexyl, cyclopentyl, cycloheptyl, phenyl, pyridyl, naphthyl, p-tolyl, p-chlorophenyl, m-(N-methyl sulfamoyl)phenyl.

Suitable examples of substituents represented by $R^3$ and $R^4$ are i.a. hydrogen, methyl, ethyl, propyl, isopropyl, butyl, pentyl, hexyl, 2-methoxyethyl, 2-cyanoethyl, benzyl, 2-hydroxyethyl, 2-(methylsulfonylamino)ethyl, methoxy, ethoxy, acetamido, dimethylsulfamoyl, dimethylcarbamoyl, chloro, bromo, fluoro.

Suitable examples of substituents represented by X are i.a. piperidino, pyrrolidino, morpholino, phenylcarbonylamino, phenylsulfonylamino, p-methylphenylsulfonylamino, methoxy, hydroxy, acetoxy, dimethylaminosulfonyloxy, di(phenyloxy)fosforyloxy, ureido, dimethylamino, anilino, diphenylamino.

Cyan dyes included within the scope of the present invention include the following.

TABLE 1

| X | Y | no. dye |
|---|---|---------|
| piperidino | H | C1 |
| pyrrolidino | CH₃ | C2 |
| NH—CO—phenyl | H | C3 |
| NH—SO₂—(p-tolyl) | H | C4 |
| OH | H | C5 |
| O—CO—CH₃ | CH₃ | C6 |
| O—SO₂—CH₃ | H | C7 |
| O—SO₂—N(CH₃)₂ | H | C8 |
| O—SO₂—(p-tolyl) | CH₃ | C9 |
| O—PO—(O—C₆H₅)₂ | H | C10 |

TABLE 1-continued

| X | Y | no. dye |
|---|---|---------|
| NH—CO—NH₂ | CH₃ | C11 |
| N(C₆H₅)₂ | H | C12 |
| N(CH₃)₂ | CH₃ | C13 |
| OCH₃ | H | C14 |
| NH—phenyl | H | C15 |
| morpholino | H | C16 |
| N-phenyl | CH₃ | C17 |
| CH₂—phenyl | | |
| O—CH₂—phenyl | H | C18 |

Cyan dyes according to the present invention can be obtained by the oxidative coupling method known in the art between p-phenylenediamine compounds or p-nitrosoaniline compounds and the appropriate 2-carbazoyl or 2-hydroxaminocarbonyl phenols or naphthols.

Representative examples of suitable p-phenylenediamine compounds are: 4-N,N-dimethylamino aniline, 4-N,N-diethylamino aniline, 4-(N-ethyl,N-hydroxyethyl)amino aniline, 4-(N-ethyl,N-cyanomethyl)amino aniline, 4-(N-ethyl,N-ethylsulfonic acid)amino aniline, 2-methyl,4-(N,N-dihydroxyethyl)amino aniline, 2-methyl,4-(N,N-diethylacetate)amino aniline, 2,6-dimethyl,4-(N,N-dihydroxyethyl)amino aniline, 2,3,5,6-tetramethyl-4-N,N-diethylamino aniline, 4-piperidino aniline, 4-morpholino aniline, 4-pyrrolidyl aniline, 4-imidazolo aniline.

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed generally has a thickness of about 0.2 to 5.0 μm, preferably 0.4 to 2.0 μm, and the amount ratio of dye to binder is generally between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/subbing layers.

Preferably the reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4,567,113, 4,572,860, 4,717,711.

The support for the receiver sheet that is used with the dye-donor element may be a transparant film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished e.g. by heating for about several milliseconds at a temperature of 400° C.

When the process is performed for but one single color, a monochrome cyan dye transfer image is obtained, which consists of at least one dye according to the present invention. A multicolor image can be obtained by using a donor element containing three or more primary color dyes, one of which consists of at least one cyan dye according to the present invention, and sequentially performing the process steps described above for each color. After the first dye has been transferred; the elements are peeled apart. A second dye-donor element (or another area of the donor element with a different dye area) in then brought in register with the dye-receiving element and the process is repeated. The third color and optionally further colors are obtained in the same manner.

Instead of thermal heads, laser light, infrared flash or heated pens can be used as the heat source for supplying heat energy. Thermal printing heads that can be used to transfer dye from the dye-donor elements of the present invention to a receiver sheet are commercially available.

The following examples are provided to illustrate the invention in more detail without limiting, however, the scope thereof.

EXAMPLE 1

Synthesis of dye C4

21.1 g (2 eq.) of $NH_2-NH-SO_2-C_6H_4-CH_3$ was added to 15.0 g (56.8 mmole) of 1-naphthol-2-carboxylic acid phenyl ester. The mixture was heated to 120° C. for 2 hours and was thereafter left overnight. Then the reaction mixture was heated again and the phenol was distilled off under vacuum. After 8 hours of heating at 120° C. the reaction mixture was cooled and 50 ml of ethanol was added. The precipitate was filtered, washed with ethanol and dried under vacuum. 6.8 g of compound (a) was obtained.

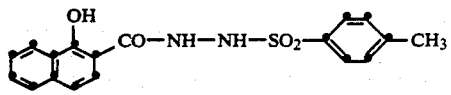

(a)

An amount of 3.0 g (8.4 mmole) of compound (a) was dissolved in 50 ml of ethyl acetate (first solution). An amount of 4.5 g of sodium carbonate was dissolved in 15 ml of water and 1.8 g of N,N-diethyl-p-phenylenediamine monohydrochloride and 30 ml of ethyl acetate was added hereto (second solution). The aqueous layer of the second solution was added immediately to the first solution. A solution of 13.8 g of $K_3Fe(CN)_6$ in 50 ml of water was made (third solution). The organic layer of the second solution and the third solution were added separately and dropwise to the first solution with stirring. After the addition stirring was continued for 30 minutes at room temperature. The precipitate was filtered, washed with water and methanol and dried. After purification by column chromatography (eluent dichloromethane/ethyl acetate 98:2) 1.5 g of dye C4 was obtained.

EXAMPLE 2

Synthesis of dye C5

10.0 g (37.9 mmole) of 1-naphthol-2-carboxylic acid phenyl ester was added to 100 ml of dimethylsulfoxide. Hereto 15.8 ml (3 eq.) of triethylamine and 2.63 g of $NH_2OH \cdot HCl$ were added. The mixture was stirred at 20° C. After completion of the reaction (monitored by thin layer chromatography with as eluent dichloromethane/methanol 90:10) the reaction mixture was extracted with ethyl acetate and 1N hydrogen chloride, washed neutral and dried. The mixture was concentrated by evaporation. 100 ml of n-hexane was added. The precipitate was filtered, washed with hexane and dried. 4.9 g of compound (b) was obtained.

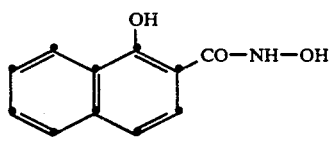

(b)

An amount of 2.0 g (9.8 mmole) of compound (b) was dissolved in 20 ml of ethyl acetate (first solution). An amount of 5.2 g of sodium carbonate was dissolved in 20 ml of water and 2.17 g of N,N-diethyl-p-phenylenediamine monohydrochloride and 20 ml of ethyl acetate was added hereto (second solution). The aqueous layer of the second solution was added immediately to the first solution. A solution of 16.2 g of $K_3Fe(CN)_6$ in 50 ml of water was made (third solution). The organic layer of the second solution and the third solution were added separately and dropwise to the first solution with stirring. After the addition the reaction mixture was left overnight. The precipitate was filtered, washed with ethyl acetate and dried. 1.0 g of dye C5 was obtained.

EXAMPLE 3

The absorption maxima ($\lambda_{max}$) and molar extinction coefficient ($\epsilon$) of the dyes identified below were determined in methanol. The results are listed in table 2.

TABLE 2

| dye | $\lambda_{max}$ (nm) | $\epsilon$ (mol$^{-1}$ cm$^{-1}$ l) |
| --- | --- | --- |
| C1  | 679 | 27702 |
| C3  | 690 | 30336 |
| C4  | 693 | 31269 |
| C5  | 675 | 27545 |
| C14 | 680 | 29370 |

EXAMPLE 4

A dye-donor element for use according to thermal dye sublimation transfer was prepared as follows:

A solution of 50 mg of dye as identified in Table 3 and 50 mg of binder in 10 ml of solvent was prepared (the nature of the binder and the solvent is identified below). From this solution a layer having a wet thickness of 100 $\mu$m was coated on 6 $\mu$m polyethylene terephthalate film. The resulting layer was dried by evaporation of the solvent.

A commerically available material supplied by Hitachi Ltd., type VY-S100A being a paper ink set, was used as receiving element.

The dye-donor element was printed in combination with the receiving element in a color video printer supplied by Hitachi Ltd., type VY-100A.

The receiver sheet was separated from the dye-donor element and the maximum color density of the recorded dye image on the receiving sheet ($D_{max}$) was measured by means of a Macbeth densitometer RD919 in Status A mode.

The stability to light of the dyes was tested as follows. The receiver sheet carrying transferred dye was divided into 3 strips. The first strip was exposed for 5 hours, the second for 15 hours and the third for 30 hours to white light and ultraviolet radiation in a Xenotest (trade name) type 50 apparatus of Hanau Quartzlampen GmbH, Hanau, W. Germany. The density was measured again and the loss of density in percent was derived.

These experiments were repeated for each of the dye/binder combinations identified in Table 3.

In table 3 B1 stands for co-vinylbutyral-vinylacetal-vinyl alcohol, B2 for nitrocellulose with a nitrogen content between 6.75% and 14.4% by weight, B3 for cellulose acetate butyrate having an acetyl content of 29.5% and a butyryl content of 17%, S1 for methyl ethyl ketone, S2 for dichloroethane and S3 for tetrahydrofuran.

TABLE 3

| dye | binder | solvent | $D_{max}$ | % density loss |  |  |
|-----|--------|---------|-----------|-----|------|------|
|     |        |         |           | 5 h | 15 h | 30 h |
| C1  | B1     | S1      | 1.64      | 9   | 16   | 33   |
| C4  | B2     | S2      | 1.83      | 2   | 3    | 6    |
| C5  | B3     | S3      | 1.42      |     |      |      |
| C14 | B3     | S1      | 1.93      | 4   | 8    | 12   |

We claim:

1. Cyan dye-donor element for use according to thermal dye sublimation transfer comprising a support having thereon a dye layer containing a 2-carbazoyl-4-[N-(p-substituted aminoaryl)imino]-1,4-quinone dye including such a dye wherein the carbazoyl moiety is substituted or a 2-hydroxaminocarbonyl-4-[N-(p-substituted aminoaryl)imino]-1,4-quinone dye including such a dye wherein the hydroxaminocarbonyl moiety is substituted.

2. Cyan dye-donor element according to claim 1, wherein the dye corresponds to formula (I)

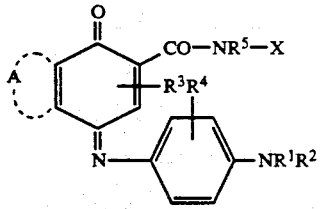

(I)

wherein
$R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with $R^4$ represent the atoms necessary for completing a fused-on heterocyclic nucleus or substituted fused-on heterocyclic nucleus;

$R^3$ is a substituent chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO₂—R', —NH—PO—R'R", —CO—NH—R', —SO₂—NH—R' wherein R' and R" (same or different) represent substituted or unsubstituted alkyl, substituted or unsubstituted cycloalkyl or substituted or unsubstituted aryl;

$R^4$ is a substituent chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO₂—R', —NH—PO—R'R", —CO—NH—R', —SO₂—NH—R' wherein R' and R" (same or different) represent substituted or unsubstituted alkyl, substituted or unsubstituted cycloalkyl or substituted or unsubstituted aryl, $R^3$ and $R^4$ being same or different, or $R^4$ together with $R^1$ and/or $R^2$ represents the atoms necessary for completing a fused-on heterocyclic nucleus or substituted fused-on heterocyclic nucleus;

$R^5$ represents hydrogen, substituted or unsubstituted alkyl, substituted or unsubstituted cycloalkyl or substituted or unsubstituted aryl;

A represents the necessary atoms for constituting an aromatic ring fused-on the benzene nucleus, said ring may also have an $R^3$ substituent, and further A may be a substituted chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO₂—R', —NH—PO—R'R", —CO—NH—R', —SO₂—NH—R' wherein R' and R" (same or different) represent substituted or unsubstituted alkyl, substituted or unsubstituted cycloalkyl or substituted or unsubstituted aryl;

X represents $NR^6R^7$ or $OR^8$;

$R^6$ and $R^7$ each independently represent hydrogen, substituted or unsubstituted alkyl, substituted or unsubstituted cycloalkyl, substituted or unsubstituted aryl, $SO_2R^9$, $COR^9$ or $POR^9R^{10}$, or $R^6$ and $R^7$ together represent the atoms necessary for completing a heterocyclic nucleus or substituted heterocyclic nucleus;

$R^8$ represent hydrogen, substituted or unsubstituted alkyl, substituted or unsubstituted cycloalkyl, substituted or unsubstituted aryl, $SO_2R^9$, $COR^9$ or $POR^9R^{10}$;

$R^9$ and $R^{10}$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted amino or a substituted or unsubstituted heterocyclic group or $R^9$ and $R^{10}$ together form a 5-or 6-membered ring.

3. Cyan dye-donor element according to claim 2, wherein A represents the necessary atoms for constituting a ring fused-on the benzene ring so that the whole forms a naphthalene ring.

4. Cyan dye-donor element according to claim 3, wherein $R^1$ and $R^2$ each represent ethyl and $R^3$, $R^4$ and $R^5$ each represent hydrogen and X represents piperidino or phenylcarbonylamino or p-methylphenylsulfonylamino or methoxy or hydroxy.

5. Cyan dye-donor element according to claim 1, wherein the dye layer comprises a binder selected from the group consisting of co-vinylbutyral-vinylacetal-vinyl alcohol, nitrocellulose and cellulose acetate butyrate.

6. Cyan dye-donor element according to claim 1, wherein the support consists of polyethylene terephthalate.

* * * * *